Nov. 12, 1963  G. M. RAPATA  3,110,338
PLASTIC ANCHOR MEMBER
Original Filed Nov. 29, 1956  2 Sheets-Sheet 1
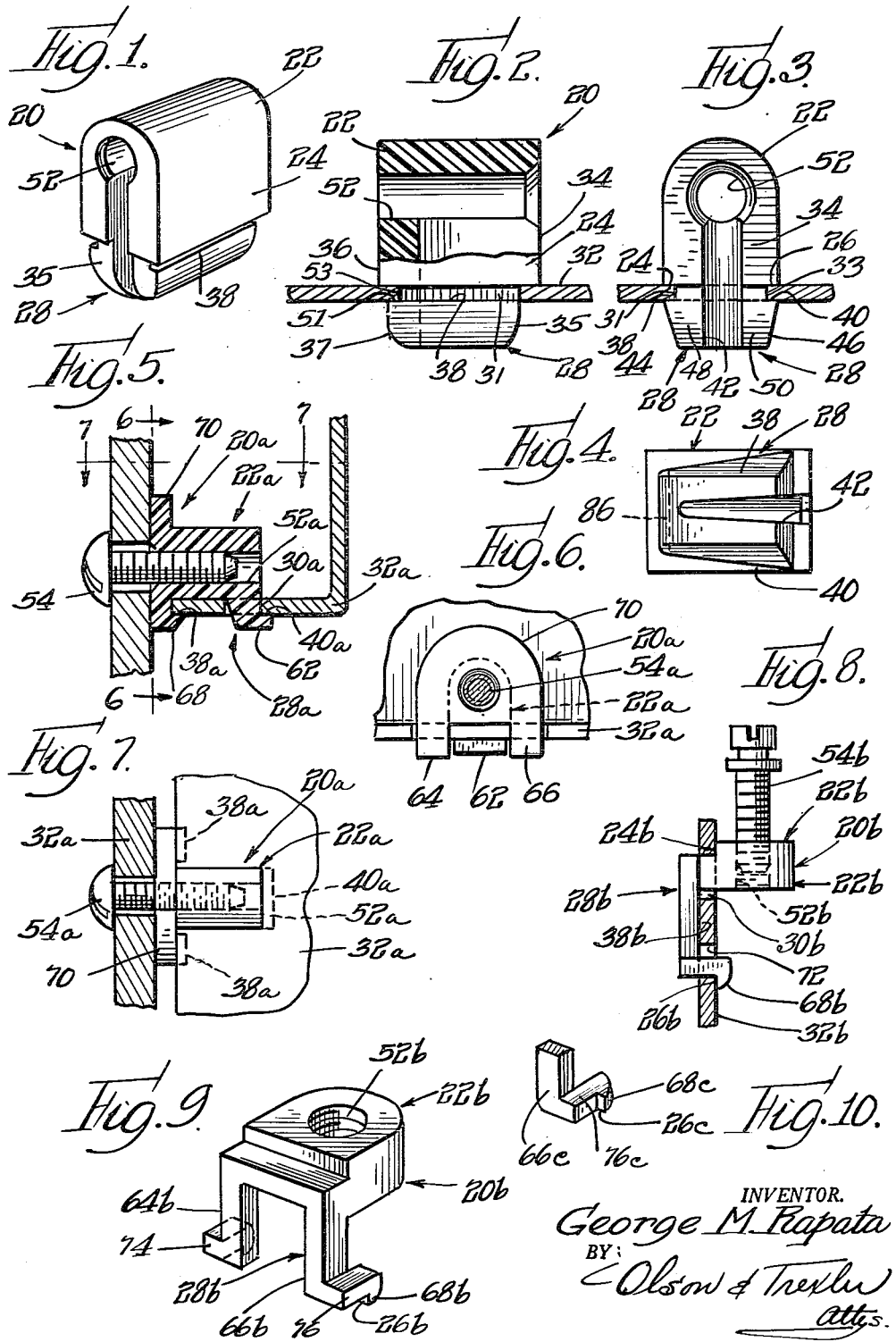
INVENTOR.
George M. Rapata
BY Olson & Trexler
Attys.

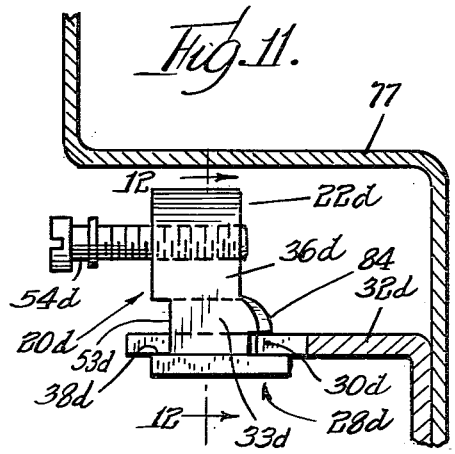
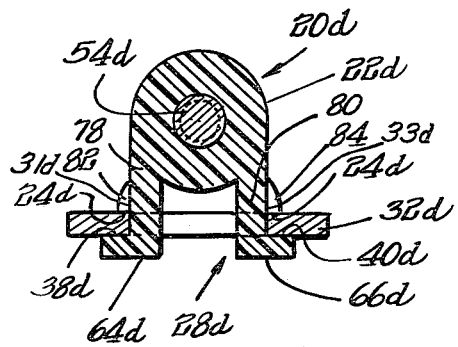
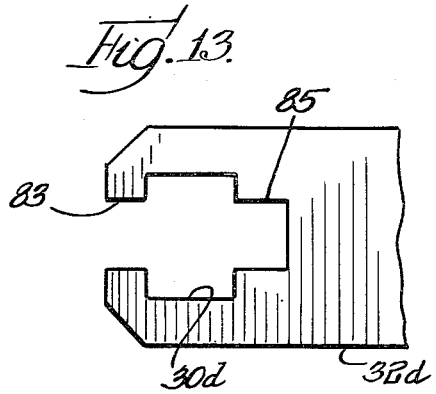
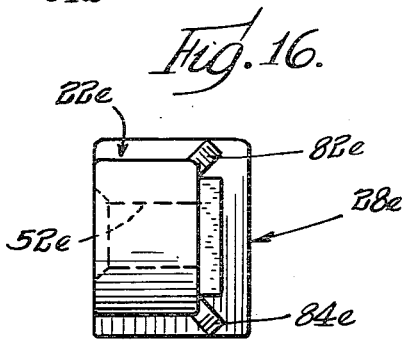
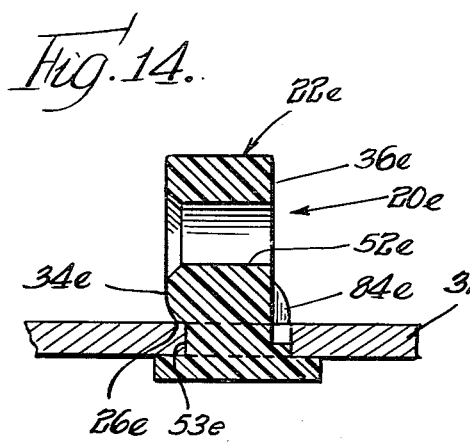
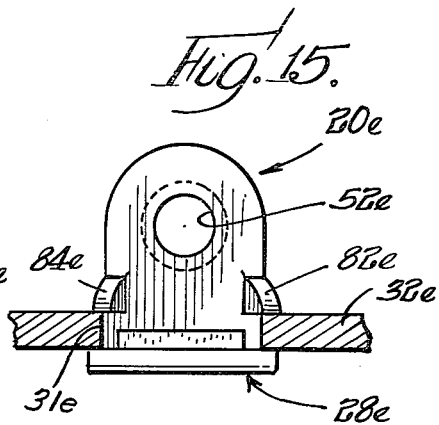

United States Patent Office 3,110,338
Patented Nov. 12, 1963

3,110,338
PLASTIC ANCHOR MEMBER
George M. Rapata, Park Ridge, Ill., assignor to Illinois Tool Works Inc., a corporation of Delaware
Original application Nov. 29, 1956, Ser. No. 625,008, now Patent No. 2,974,703, dated Mar. 14, 1961. Divided and this application Nov. 3, 1960, Ser. No. 67,050
3 Claims. (Cl. 151—41.75)

The present invention relates to a novel fastening device, and more particularly to a novel device adapted to be applied to an apertured workpiece and to receive a screw member or the like. This application is a division of co-pending application Serial No. 625,008, filed November 29, 1956 now Patent No. 2,974,703.

There are numerous structures wherein it is necessary or desirable to mount a threaded member or screw on a workpiece so that it is disposed generally parallel to the workpiece. For example, in certain electronic chassis utilizing a printed circuit panel, it is desirable to support a carbon core having a threaded part substantially parallel to the panel for cooperation with a coil on the panel for providing a screw adjustment of the carbon core with respect to the coil. The above mentioned general arrangement of the screw member with respect to a workpiece has also been found to be useful for securing electronic chassis to wood cabinets and for automobile headlight adjustment screws.

An important object of the present invention is to provide a novel one-piece molded fastening device or anchor member which may be easily and securely applied to an apertured workpiece and which is adapted to receive and support a threaded member or screw so that the member is disposed transversely of the axis of the fastening device and/or substantially parallel to the apertured workpiece.

A more specific object of the present invention is to provide a novel one-piece molded plastic anchor member which is constructed so that it is adapted to be easily snapped through an aperture in a workpiece and securely connected to the workpiece and so that a portion thereof disposed at one side of a workpiece can accommodate and support a threaded member or screw located substantially entirely at one side of a workpiece.

Another more specific object of the present invention is to provide a novel fastening device or anchor member of the above described type which is constructed so as resiliently and aggressively to engage an apertured workpiece when fully applied thereto for insuring secure connection therewith and also for preventing relative rotation or other eccentric movement between the anchor member and the workpiece when the anchor member is fully applied to the workpiece so as to facilitate application of a threaded member or screw to the anchor member and to insure proper location of the threaded member or screw with respect to the workpiece when it is applied to the anchor member.

Other objects and advantages of the present invention will become apparent from the following description and the accompanying drawings wherein:

FIG. 1 is a perspective view showing a fastening device or anchor member incorporating the features of the present invention;

FIG. 2 is a partial sectional view showing the device of FIG. 1 applied to an apertured workpiece;

FIG. 3 is a sectional view taken along lines 3—3 in FIG. 2 and further shows a threaded member assembled with the novel anchor member;

FIG. 4 is an entering end view of the anchor member;

FIG. 5 is a sectional view showing a modified form of the present invention;

FIG. 6 is a sectional view taken along the line 6—6 in FIG. 8;

FIG. 7 is a sectional view taken along line 7—7 in FIG. 5;

FIG. 8 is a partial sectional view showing another modified form of the present invention;

FIG. 9 is a perspective view showing the novel anchor member of FIG. 8;

FIG. 10 is a fragmentary perspective view showing a further modification of the embodiment of FIGS. 8 and 9;

FIG. 11 is a partial sectional view showing another modified form of the present invention;

FIG. 12 is a sectional view taken along line 12—12 in FIG. 11;

FIG. 13 is a fragmentary view showing an apertured workpiece adapted to receive the anchor member of FIGS. 11 and 12;

FIG. 14 is a sectional view showing a further modified form of the present invention;

FIG. 15 is a side elevational view of the embodiment shown in FIG. 14; and

FIG. 16 is an entering end view of the embodiment shown in FIGS. 14 and 15.

Referring now more specifically to the drawings wherein like parts are designated by the same numerals throughout the various figures, a fastening device or anchor member 20 incorporating one embodiment of the present invention is shown in FIGS. 1–4. In this embodiment the anchor member comprises a body section 22 having opposite side surfaces 24 and 26 which provide shoulder means engageable with one side of an apertured workpiece or panel, and an attachment section 28 engageable with an opposite side of a workpiece or panel and cooperable with the shoulder means or surfaces 24 and 26 for securely retaining the anchor member in assembled relationship with the workpiece. The attachment section is provided with a polygonal and preferably rectangular cross-sectional shape and is adapted to be inserted through a complementary rectangular aperture 30 in a workpiece or panel 32 as shown in FIGS. 2 and 3. Substantially flat surfaces 31 and 33 extend axially from the shoulders for engaging the straight side edges of the workpiece aperture 30 for preventing the anchor member from turning with respect to the workpiece. The attachment section is formed so as to provide workpiece engageable surfaces or shoulders 38 and 40 which project laterally substantially outwardly from the opposite side surfaces 31 and 33.

The anchor member 20 is preferably molded in one-piece from suitable plastic material such, for example, as nylon, and the shoulders or surfaces 38 and 40 are formed so that the maximum distance therebetween is greater than the width of the workpiece aperture 30 whereby the attachment section must be collapsed during insertion thereof through the aperture. In order to facilitate such collapsing of the attachment section, a narrow generally axially extending slot means 42 is provided therein, which slot extends between opposite sides 35 and 37 of the attachment section and also sides 34 and 36 of the body section. The slot means 42 extends from the sides 34 and 35 toward but short of the sides 36 and 37. An entering end section of the attachment section is provided with converging cam surfaces 44 and 46 extending from junctions with the shoulder surfaces 38 and 40, which cam surfaces cause opposite resilient portions 48 and 50 of the attachment section which are separated by the slot to be deflected inwardly when the cam surfaces engage edges of the workpiece aperture during assembly of the anchor member with the workpiece.

The shoulder means 38 and 40 respectively merge with additional shoulder means 51 which extends from a rigid surface 53 at the closed side of the attachment section, and the open side 35 of the attachment section is rounded as shown best in FIG. 2. The anchor member 20 may be easily applied to the workpiece by first inserting the narrower side 35 into the aperture and then pivoting the anchor member to axially align it with the workpiece aperture and force it into the aperture so that the attachment section 28 is collapsed sufficiently to enable the shoulders to be snapped beneath the workpiece.

It is important to note that the body section 22 is provided with a bore or aperture 52 therethrough, which aperture traverses the axis of the anchor member and is preferably substantially parallel to the surfaces or shoulders 38 and 40 of the attachment section. In other words, the aperture 52 is disposed so that when the anchor member is applied to a workpiece, the axis of the aperture 52 will be substantially parallel to the workpiece. The aperture 52 is formed with a smooth unthreaded wall having a diameter less than the diameter of a threaded member or screw to be inserted therein so that when a threaded member 54 is applied to the anchor member as shown in FIG. 3 complementary threads will be formed in the wall of the aperture. Furthermore, the aperture is substantially bisected by the slot 42 so that when the threaded member 54 is inserted into the aperture, the device will be expanded or spread apart for more aggressively urging the shoulder surfaces into engagement with the workpiece. As mentioned hereinabove, the threaded member 54 may be used for adjusting a carbon core or for securing another workpiece through the workpiece 32 or for any other desired purpose. In certain installations a rounded aperture may be provided in the workpiece so that the anchor member may be turned to permit access to the stud or threaded member so that the stud may be easily adjusted or turned.

FIGS. 5–7 show another embodiment of the present invention wherein elements corresponding to those described above are indicated by identical reference numerals with the suffix $a$ added. In this embodiment the anchor member 20$a$ is adapted to be applied to a marginal portion of an apertured workpiece 32$a$, and in the particular structure shown for the purpose of illustrating the invention, the anchor member is adapted to receive a screw 54$a$ for securing the workpiece 32$a$ to another workpiece or frame member 50. In this embodiment, the body section 22$a$ is solid except for the transverse aperture 52$a$ which has a smooth wall so that the screw member will impress complementary threads therein. The attachment section of this embodiment includes a first portion 62 adapted to project through an aperture 30$a$ in the workpiece and providing a shoulder 40$a$ adapted to hook beneath the workpiece. Additional portions 64 and 66 of the attachment section are adapted to project around the margin of the workpiece and present shoulders 38$a$ for hooking beneath the workpiece in the manner shown. In order to assemble the anchor member 20$a$ with the workpiece, the anchor member is first tilted with respect to the workpiece and the hook portion 62 of the attachment section is inserted through the aperture 30$a$. Then the anchor member is pivoted about the hook portion 62 so that the hook portions 64 and 66 are resiliently flexed outwardly from the hook portion 62 and then snapped beneath the workpiece to the position shown in the drawings. Cam surfaces 68 on the hook portions 64 and 66 will initially engage the edge of the workpiece during the above mentioned pivotal movement of the anchor member and promote outward flexing of the hook portions 64 and 66 so as to permit the shoulder surfaces 38$a$ to be snapped beneath the workpiece. Preferably, the body section is provided with an enlarged end flange 70 adapted to abut the frame member 60 so that when the screw member is tightened, the anchor member will be rigidly held with respect to the frame member.

FIGS. 8 and 9 show an anchor member or fastening device 20$b$ embodying another modified form of the present invention. This embodiment is particularly adapted for application to a workpiece 32$b$ having a pair of apertures 30$b$ and 72 therein. In this embodiment, the body section 22$b$ is adapted to be inserted through the aperture 30$b$ and is provided with a shoulder 24$b$ at one side thereof for engaging one surface of the workpiece 32$b$ after the body section has been inserted through the aperture and then shifted laterally to the position shown in FIG. 8. Elements 64$b$ and 66$b$ of the attachment section 28$b$ extend laterally from the body section and oppositely from the shoulder 24$b$ for overlying an opposite surface of the workpiece and terminate in flexible hooked finger portions 74 and 76 having shoulders 26$b$ thereon adapted to be snapped through the aperture 72 for engaging the workpiece as shown in FIG. 8. In this embodiment, the shoulder surfaces 26$b$ extend laterally away from the body section 22$b$ in the same direction as the portions 64$b$ and 66$b$ and the cam surfaces 68$b$ are provided at the ends of the finger portions so that the finger portions will be flexed back toward the body section when the shoulders are snapped through the aperture 72. FIG. 10 provides a fragmentary disclosure of an anchor member which is identical to the embodiment of FIGS. 8 and 9 except that the finger portion 76$c$ is disposed so that its shoulder 26$c$ extends laterally outwardly of the element 66$c$, and, of course, the other finger element of this embodiment which is not shown and which corresponds to the finger element 74 may be similarly disposed.

FIGS. 11–13 show another embodiment of the present invention wherein elements corresponding to those described above are designated by identical reference numerals with the suffix $d$ added. In this embodiment the anchor member 20$d$ is shown mounted on a workpiece or bracket 32$d$ in a headlight assembly including a shell 77 for supporting a headlight adjusting screw. In this embodiment the body section 22$d$ is adapted to be inserted through the workpiece aperture 30$d$ and includes leg portions 78 and 80 connecting it with the elements 64$d$ and 66$d$ of the attachment section 28$d$. Resilient protuberances 82 and 84 project laterally outwardly respectively from the leg portions 78 and 80 and that the same side 36$d$ of the body section for presenting shoulders 24$d$ adapted to be snapped through the workpiece aperture for engaging the workpiece and for cooperating with the attachment section to secure the anchor member to the workpiece as shown in FIGS. 11 and 12. By providing the relatively discrete shoulders at the same side 36$d$ of the body section, the anchor member is permitted to float or twist a certain amount with respect to the workpiece 32$d$, which float is required for the adjusting screw 54$d$ in a headlight assembly as will be understood. The adjusting screw 54$d$ may be preassembled with the anchor member, and in order to permit such an assembly to be applied to the workpiece 32$d$ a slot 83 is formed between the end of the workpiece and the aperture 30$d$ for providing clearance for the screw member. An additional slot 85 may be formed in the workpiece at the opposite side of the aperture 30$d$ as shown in FIG. 12 for providing additional clearance for the screw member so that the screw member may be threaded through the anchor member body section so as to project from the side 36$d$ thereof prior to assembly of the anchor member with the workpiece. It will be appreciated that the threaded member or screw may be preassembled with other embodiments of the anchor member disclosed herein, and if this is done in the embodiment of FIGS. 8 and 9, for example, a clearance slot similar to the slot 83 will be provided in the workpiece 32$d$.

FIGS. 14–16 show an anchor member 20$e$ incorporating another embodiment of the present invention. This embodiment is similar to the embodiment of FIGS. 11–13 except that the attachment section is solid and, more importantly, the body section 22$e$ is formed so as to provide a workpiece engaging shoulder 26$e$ at the side 34$e$ of the body section opposite from the protuberances 82e and 84e so as to restrain tilting or floating of the anchor member with respect to the workpiece.

While the preferred embodiments of the present invention have been shown and described herein, it is obvious that many structural details may be changed without departing from the spirit and scope of the appended claims.

The invention is claimed as follows:

1. A one-piece molded plastic anchor member adapted to be applied to an apertured workpiece for receiving a threaded member, comprising a body section presenting laterally extending shoulder surfaces engageable with one side of a workpiece, and an attachment section extending along a predetermined central axis from said body section and being insertable through a workpiece aperture, said body section including means providing a bore extending along a second axis disposed transversely of said first mentioned axis for receiving a threaded member and supporting said threaded member at one side of and generally parallel to said workpiece, means providing a narrow slot extending through and from an entering end of said attachment section and intersecting said bore means along a line extending generally parallel to said second axis, said slot also extending through and from a first side of said attachment section toward but short of a second opposite side of said attachment section, and said attachment section including laterally extending shoulders respectively along opposite sides thereof disposed between said first and second sides and engageable with a side of the workpiece opposite from said first mentioned shoulders when said attachment section is inserted through said workpiece aperture, said attachment section including an additional shoulder at and extending outwardly from said second side for engagement beneath the workpiece when the attachment section is applied to the workpiece, said first side being spaced from said central axis and said spacing being a maximum in the vicinity of a shoulder surface of said body section, said slot means facilitating collapsing of said attachment section shoulders toward each other during application of the attachment section to the workpiece, and the application of a threaded member to said bore means serving to urge said shoulders for more aggressive engagement with the workpiece.

2. An anchor member, as defined in claim 1, wherein said pair of opposite sides of said attachment section and said shoulders thereon diverge with respect to each other from said second attachment section side toward said first attachment section side.

3. An anchor member, as defined in claim 1, wherein said first side of said attachment section has a free entering end portion thereof inclined toward said second side for facilitating initial entry of the attachment section into the apertured workpiece.

References Cited in the file of this patent

UNITED STATES PATENTS

| 2,629,248 | Burdick | Feb. 24, 1953 |
| 2,688,655 | Gross | Sept. 7, 1954 |
| 2,836,214 | Rapata | May 27, 1958 |
| 2,836,215 | Rapata | May 27, 1958 |
| 2,873,496 | Elms | Feb. 17, 1959 |

FOREIGN PATENTS

| 599,050 | Great Britain | Mar. 3, 1948 |
| 707,819 | Great Britain | Apr. 21, 1954 |
| 1,108,208 | France | Aug. 24, 1955 |